May 12, 1942.   S. S. MARCUS ET AL   2,282,664
APPARATUS FOR ASSEMBLING COILED SPRING UNITS
Filed July 30, 1940   4 Sheets-Sheet 1

Fig. 1.

INVENTORS
SAMUEL S. MARCUS
BY   SAMUEL KRAKAUER
Clark & Ott
ATTORNEYS

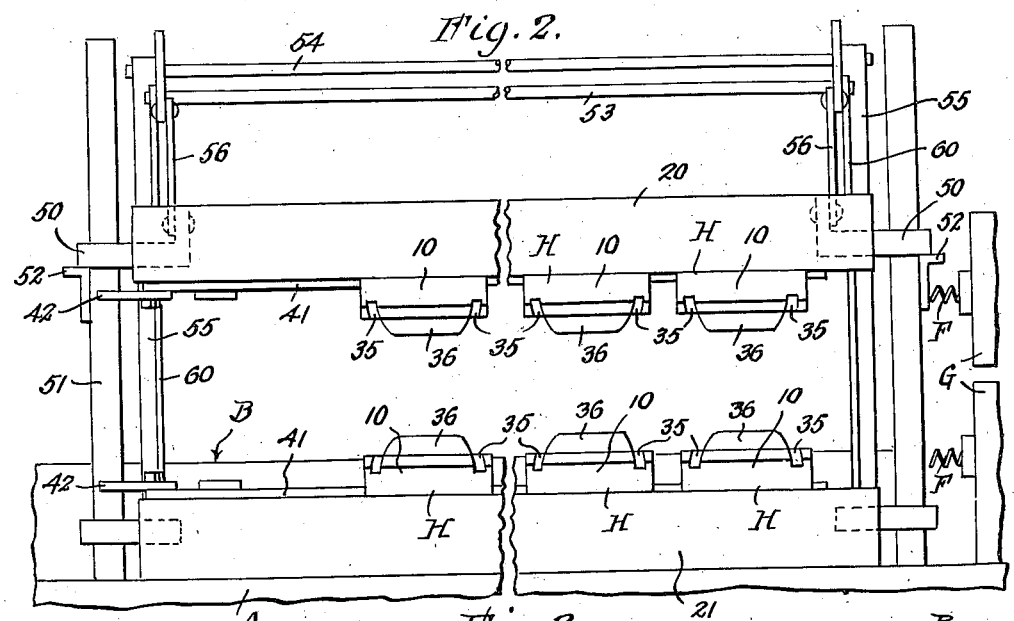
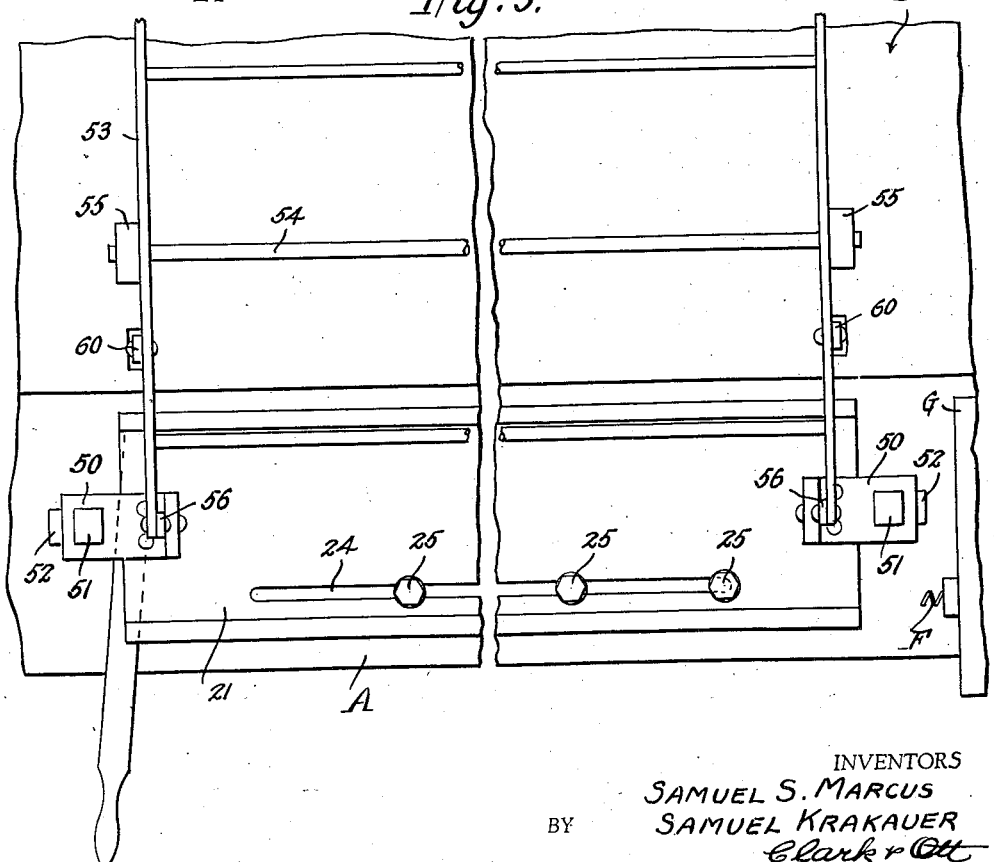

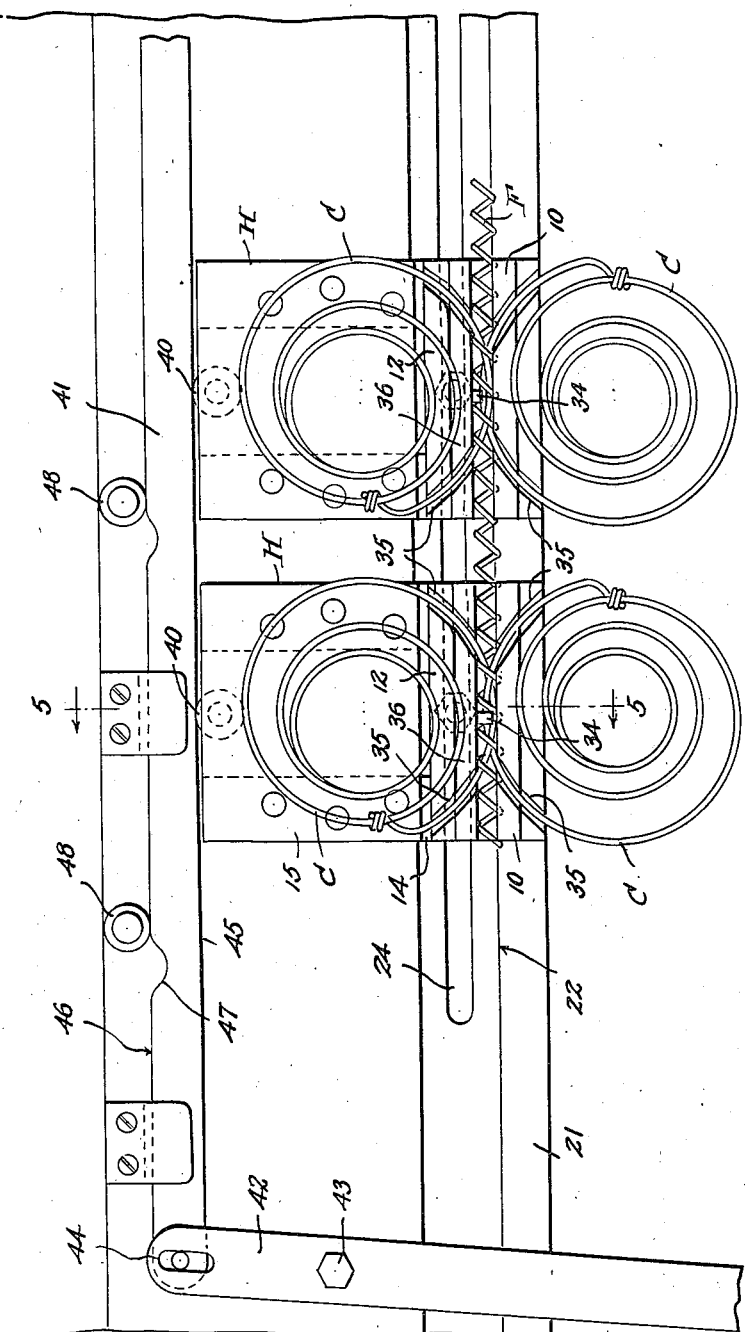

INVENTORS
SAMUEL S. MARCUS
SAMUEL KRAKAUER
Clark & Ott
ATTORNEYS

Patented May 12, 1942

2,282,664

UNITED STATES PATENT OFFICE 2,282,664

APPARATUS FOR ASSEMBLING COILED SPRING UNITS

Samuel S. Marcus, Lewisboro, and Samuel Krakauer, New York, N. Y.

Application July 30, 1940, Serial No. 348,476

12 Claims. (Cl. 140—3)

This invention relates to apparatus for assembling coiled spring units by means of helical tie wires to provide interspring structures of the so-called "Bonnell" type for use in mattresses, seat cushions or the like.

The present invention is particularly directed to an improved apparatus for facilitating the expeditious relative positioning of the upper and lower convolutions of adjacent rows of coiled spring units and for holding the same in juxta-position while serving to guide the helical tie wires into uniform embracing relation with the convolutions of the several spring units.

More particularly the invention comprehends a coiled spring unit assembling apparatus which includes a plurality of pairs of upper and lower members each of which embodies relatively movable clamping jaws for respectively receiving and retaining in predetermined position the upper and lower convolutions of adjacent rows of coiled spring units with means for guiding helical tie wires into embracing relation with the convolutions of the several spring units together with means for simultaneously opening and closing the jaws to positions for receiving and clamping therebetween the upper and lower end convolutions of the spring units and for releasing said end convolutions from the jaws so as to facilitate the positioning, holding and release of said spring units and the guiding of the helical tie wires into tying relation to the spring units while so positioned and held by the jaws.

The invention further embodies an apparatus of the indicated character and for the purpose specified which is so constructed and arranged as to permit of the adjustment thereof to vary the spacing of the spring units of various sizes.

With the above recited and other objects in view, the invention is set forth in greater detail in the following specification and illustrated in the accompanying drawings in which:

Fig. 1 is a side view of the spring assembling apparatus illustrating the same in a position for holding the spring units in relative position for assembling and for guiding the tie wires.

Fig. 2 is a fragmentary front view thereof.

Fig. 3 is a fragmentary plan view of the same.

Fig. 4 is an enlarged fragmentary plan view of the lower beam and spring holding and guide members with the spring units and tie wires in relative position.

Figure 5:
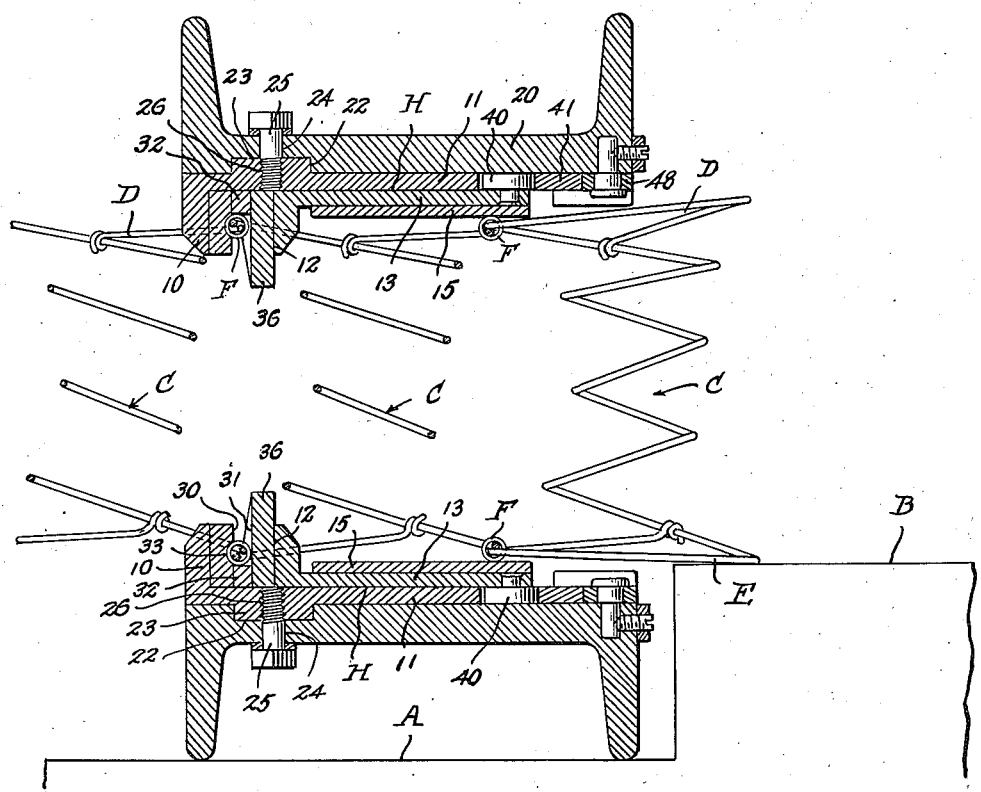
Fig. 5 is an enlarged vertical sectional view taken approximately on the line 5—5 of Fig. 4.
Figure 6:
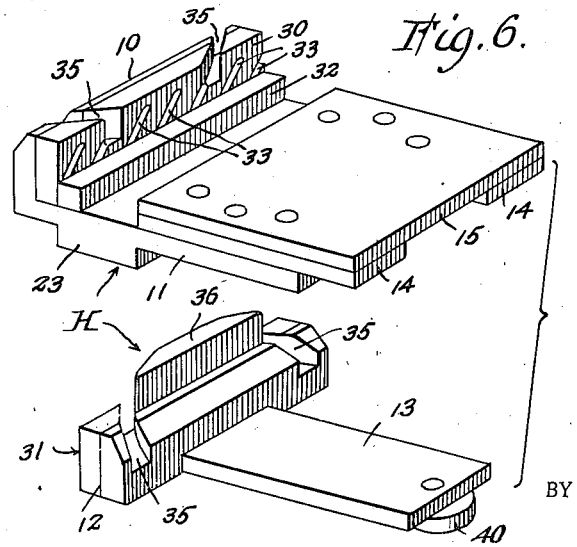
Fig. 6 is a collective perspective view of the jaw elements of the spring holding and guide members in separated juxta-position.
Figure 7:
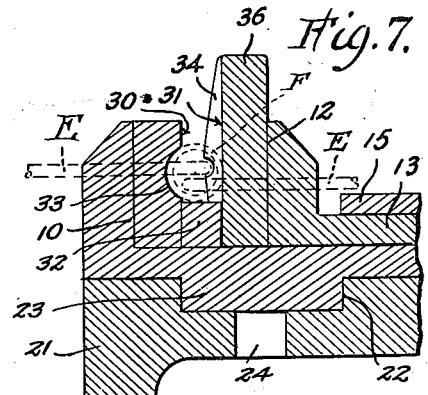
Fig. 7 is a fragmentary enlarged sectional view similar to and taken approximately on the same line as Fig. 5 with the end convolutions of the spring units and the tie wires shown in broken lines.

Referring to the drawings by characters of reference, A designates a table or equivalent support for the apparatus and which defines a horizontal surface B upon which the assembled rows of spring units are adapted to rest and over which the same are moved during the assembling operation. The spring units are designated generally by the reference character C and as herein shown are of the conventional double conical type having upper and lower end convolutions D and E which are adapted to be disposed and secured respectively in substantially common planes parallel to each other by means of helical tie wires F. The helical tie wires are adapted to be spirally fed from any suitable mechanism G across adjacent rows of the spring units C, which mechanism may be of the type illustrated and described in our prior U. S. Letters Patent No. 2,031,894, granted February 25, 1936.

The apparatus constituting the present invention consists of a plurality of substantially identical members designated generally by the reference character H. Each of the members H is made up of a fixed jaw 10 having a horizontally disposed base 11 and a movable jaw 12 having a horizontally disposed shank 13 which is mounted for guided movement with reference to the base 11 between parallel guide strips 14 and a guide plate 15 secured in spaced parallel relation to the base 11 by means of the guide strips 14. The members H are carried by upper and lower beams 20 and 21 which, in the present instance, are illustrated as of channel-shape in cross section with the lower beam resting upon and secured to the table A and having the members H arranged thereupon. The upper beam 20 is supported from the table A for vertical movement towards and away from the lower beam 21 and has the members H secured to the underside thereof in confronting reversed relation to the members H on the lower beam.

As illustrated in the present embodiment, the upper surface of the lower beam and the lower surface of the upper beam are each provided with a continuous longitudinally extending groove 22 which receives therein a transverse rib 23 formed on the base 11 of each member H. The web portion of each beam is provided with a longitudinal slot 24 which opens medially of the groove 22 and which receive therethrough the shanks of stud screws 25, the threaded terminals of which are anchored in threaded openings 26 in the ribbed portions 23 of the bases 11 of the members H to thus secure the members in place and to permit of the adjustable setting of the members H on the beams 20 and 21 to vary the spacing of the spring units in the rows and to accommodate the apparatus to spring units of various diameters.

The jaws 10 and 12 of the members H are disposed perpendicular to the base 11 and the shank 12 and parallel to each other with the confronting inner faces 30 and 31 defining a space therebetween for receiving the end convolutions D or E of adjacent rows of spring units. Preferably each jaw 10 is formed with a shoulder 32 adjacent its juncture with the shank 11 which is designed to limit the closing movement of the movable jaw 12 towards the jaw 10 and to further serve as a guide surface with which the helical tie wires F cooperate. The inner confronting face 30 of each jaw 10 is formed with a series of parallel equally spaced inclined grooves 33 corresponding to the pitch of the convolutions of the helical tie wires F and with which the convolutions of the tie wires engage for guiding the same into embracing relation with the overlapped end convolutions of the spring units C. The confronting face 31 of each jaw 12 is formed with a notched spacing lug 34 adapted to engage with the end convolution of the spring unit to space said convolution from the jaw face 31 so as to provide a clearance between said spring unit convolution and said jaw face sufficient to permit the helical tie wire to be reeved about said end convolution as the tie wire is spirally fed between the jaws. It will also be understood that the grooves 33 are of a sufficient depth to counter-sink the diametrically opposite portion of the tie wire convolution below the face 30 of the jaw 10 to permit the same to be reeved around the end convolution of the adjacent spring unit.

In order to permit the end convolutions D and E to be emplaced between the jaws at a position near the shoulders 32, the jaws are each provided with a pair of converging notches 35, the depth of which notches are such that the end convolutions of the spring units C, will be spaced from the shoulders 32 to allow the tie wires F to be freely reeved about the overlapped end convolutions of the spring units.

In order to facilitate the rapid and accurate positioning of the upper and lower end convolutions of the adjacent rows of coiled spring units between the jaws 10 and 12, the jaws 12 are mounted for sliding movement towards and away from the jaws 10 and each jaw 12 between its pair of notches 35 is formed with an upstanding portion 36 protruding beyond the free end of the jaw 10 to provide an abutment with which the end convolutions D and E of the spring units are initially engaged to move the movable jaws 12 rearwardly for opening the jaws as the spring units are emplaced therein. The shank 13 of each movable jaw 12 extends rearwardly beyond the base 11 of the fixed jaw 10 and has secured thereto a roller 40 which is mounted to turn on a vertical axis and is located between the rear terminal of the shank and the web of the beam.

A slidable shift bar 41 is carried by each beam and the same is shifted longitudinally by means of a lever 42 which is fulcrumed as at 43 and has a pin and slot connection 44 with the shift bar. The forward edge 45 of the shift bar engages with the rollers 40 of all of the members H of each beam and the shift bar is provided at longitudinally spaced points in its rear edge 46 with cam notches 47 which, at one position of the shift bar, register with fixed cam rollers 48 on the beam so as to permit the movable jaws 12 to be shifted rearwardly during the emplacement or removal of the end convolutions of the spring units between the jaws. It will be understood that after the adjacent rows of spring units have been positioned between the jaws, the lever 42 will be swung in a direction to shift the shift bar 41 so that the cam notches 47 riding over the cam rollers 48 will simultaneously advance the movable jaws 12 forwardly to retain the end convolutions of the spring units in juxtaposition between the jaws 10 and 11 to receive the helical tie wires F as they are spirally fed by the mechanism G to thus guide the helical tie wires into uniform embracing relation with the overlapped end convolutions of the adjacent rows of spring units C.

The upper beam 20 may be supported for vertical movement towards and away from the lower beam 21 in any desired manner but as herein illustrated the same is provided at its opposite ends with outwardly protruding guide ears 50 which slidably engage standards 51 carried by and extending upwardly from the table A. Each standard has secured thereto for vertical adjustment a stop element 52 which limits the downward movement of the upper beam 20 by the engagement of the stop ears 50 therewith. Any suitable means may be employed for raising and lowering the upper beam 20 but as herein shown said means consists of a frame 53 fulcrumed at 54 to the standards 55 which are carried by and project upwardly from the table A. The forward end of the frame is connected by links 56 to the upper beam 20 and the rear portion of the frame is provided with one or more weights 57 which counter-balances the upper beam and serves to normally swing the same upwardly an appropriate distance to provide a space between the portions 36 of the movable jaws 12 of the upper and lower members H to permit of the passage of the fully expanded spring unit C therebetween. Any suitable means may be provided for lowering the upper beam 20 but, as here illustrated, a foot pedal 58 is provided which is fulcrumed at 59 and which is connected to the frame 53 by a link 60.

The fixed jaw may, if desired, be provided as illustrated, with a separate inner face plate which is detachably associated therewith to permit of its removal and replacement when worn or the selective use of similar face plates respectively provided with inclined grooves 33 of varying widths and inclinations to coincide with helical tie wires F having different gages and pitches.

In use and operation, the stop elements 52 are set at a vertical adjustment which will dispose the upper beam 20 when lowered at a position where the spring units C will be vertically compressed or contracted and the mechanism G which spirally feeds the helical tie wires F will be properly adjusted so that the vertical spacing of the helical tie wires will coincide with the jaws 10 and 12 of the upper and lower members H. The operator, after initially setting the members H in the desired spaced relations on the beams 20 and 21, causes the upper beam 20 and the members H carried thereby to be raised and inserts a row of spring units C in place on the bottom members H by arranging the lower convolutions E between the jaws 10 and 11 with the same arranged in the notches 35 of the removable jaws 12. He then sets in an adjacent row of springs with portions of the lower convolutions E overlapping those of the initially positioned row of spring units and with said convolutions fitted into the notches 35 of the front fixed jaws 10. During the emplacement of the lower spring convolutions the movable jaws will be shifted rearwardly, it being understood that the shift bar 41 has been previously moved to register the cam notches 47 with the cam rollers 48. This having been done, he swings the lever 42 to the left to the position shown in Fig. 4 thereby advancing the movable rear jaws 12 forwardly to their closed position and while depressing the foot pedal 58 to move the upper beam and members H downwardly, positions the upper end convolutions D in a similarly overlapped arrangement between the jaws 10 and 12 of the upper members H. The lever controlling the shift bar 41 of the upper beam 20 is then swung to the left and the mechanism G is actuated to feed the helical tie wires F across the rows of spring units so that they are guided between the jaws of the upper and lower members H and by means of the inclined grooves 33 caused to embracingly engage the overlapped end convolutions of the adjacent rows of springs to connect the same together in assembled relation. After the first two rows of springs are connected, the shift bars 41 are shifted to the right to register the cam notches 47 with the cam rollers 48 and the forward row of spring units C are then brought into the position of the rear row which is moved rearwardly over the table surface B and another row of spring units are emplaced so that their upper and lower convolutions are in overlapped relation to the forward row of connected spring units, the operation being repeated to effect a connection of the adjacent rows by the helical tie wires F. By employing more or less of the members H, or by variously spacing said members, the number of springs in each row and the spacing thereof may be varied according to the size of interspring structure to be produced.

What is claimed is:

1. In an apparatus for assembling coiled spring units by means of helical tie wires which embrace the overlapped end convolutions of adjacent spring units, upper and lower spring positioning and tie wire guiding members each including relatively movable clamping jaws for receiving and retaining in predetermined position therebetween the upper and lower end convolutions of adjacent spring units, and means on the confronting face of one clamping jaw of each member for spacing the end convolution of one spring unit from the face thereof to provide a clearance for the tie wire, and the confronting face of the opposite jaw of each member having a series of spaced parallel inclined grooves corresponding to the pitch of the helical tie wires for guiding said tie wires into embracing relation with the overlapped upper and lower end convolutions of said adjacent spring units.

2. In an apparatus for assembling coiled spring units by means of helical tie wires which embrace the overlapped end convolutions of adjacent spring units, upper and lower beams, a plurality of spring unit positioning and tie wire guiding members carried respectively by said upper and lower beams, each member including relatively movable clamping jaws for receiving and retaining in predetermined position therebetween the upper and lower end convolutions of adjacent spring units, and means on the confronting face of one clamping jaw of each member for spacing the end convolution of one spring unit from said face to provide a clearance for the tie wire, and the confronting face of the opposite jaw of each member having a series of spaced parallel inclined grooves corresponding to the pitch of the helical tie wires for guiding said tie wires into embracing relation with the overlapped upper and lower end convolutions of said adjacent spring units and the confronting upper and lower edges of the jaws of each member having converging grooves for receiving and positioning the upper and lower end convolutions of adjacent spring units in overlapped relation.

3. In an apparatus for assemblying coiled spring units by means of helical tie wires which embrace the overlapped end convolutions of adjacent spring units, upper and lower beams, a plurality of spring unit positioning and tie wire guiding members carried respectively by said upper and lower beams, each member including relatively movable clamping jaws for receiving and retaining in predetermined position therebetween the upper and lower end convolutions of adjacent spring units, means on the confronting face of one clamping jaw of each member for spacing the end convolution of one spring unit from said face to provide a clearance for the tie wire, grooves formed in the confronting face of the opposite jaw of each member for guiding the tie wires into embracing relation with the overlapped upper and lower end convolutions of said adjacent spring units, and means for raising and lowering the upper beam and the members carried thereby to space the upper members from the lower members for positioning the spring units therebetween and for lowering said upper beam and members when the spring units are emplaced so as to tension and retain said units in position by said tensioning action until the tie wires are embracingly engaged therewith.

4. In an apparatus for assemblying coiled spring units by means of helical tie wires which embrace the overlapped end convolutions of adjacent spring units, upper and lower beams, a plurality of spring unit positioning and tie wire guiding members carried respectively by said upper and lower beams, each member including relatively movable clamping jaws for receiving and retaining in predetermined position therebetween the upper and lower end convolutions of adjacent spring units, means on the confronting face of one clamping jaw of each member for spacing the end convolution of one spring unit from said face to provide a clearance for the tie wire, grooves formed in the confronting face of the opposite jaw of each member for guiding the tie wires into embracing relation with the overlapped upper and lower end convolutions of said adjacent spring units, means for raising and lowering the upper beam and the members carried thereby to space the upper members from the lower members for positioning the spring units therebetween and for lowering said upper beam and members when the spring units are emplaced so as to tension and retain said units in position by said tensioning action until the tie wires are embracingly engaged therewith, and a common means on each of the beams engageable with the movable clamping jaws thereon to simultaneously effect the closing movement of the same.

5. In an apparatus for assembling coiled spring units by means of helical tie wires which embrace the overlapped end convolutions of adjacent spring units, upper and lower beams, a plurality of spring unit positioning and tie wire guiding members carried respectively by said upper and lower beams, means for securing said members in adjusted spaced relation longitudinally of said beams to vary the spacing of the assembled coiled spring units and to compensate for variations in the diameters of said spring units, each member including relatively movable clamping jaws for receiving and retaining in predetermined position therebetween the upper and lower end convolutions of adjacent spring units, means on the confronting face of one clamping jaw of each member for spacing the end convolution of one spring unit from said face to provide a clearance for the tie wire, and grooves formed in the confronting face of the opposite jaw of each member for guiding the tie wires into embracing relation with the overlapped upper and lower end convolutions of said adjacent spring units.

6. In an apparatus for assembling coiled spring units by means of helical tie wires which embrace the overlapped end convolutions of adjacent spring units, including upper and lower unit positioning and tie wire guiding members adapted to respectively cooperate with the adjacent upper and lower end convolutions of adjacent spring units, each member including a fixed element having a horizontal base and a vertical jaw, a movable element having a horizontal shank and a vertical jaw parallel to the jaw of the fixed element, guide means on the fixed element slidably associating the shank of the movable element to guide the movable jaw towards and away from the fixed jaw, a shoulder at the inner end of one jaw engageable with the other jaw to limit the closing of the jaws and to define together with the confronting faces of said jaws a guideway for the helical tie wire and a space for the reception in overlapped relation of the end convolutions of adjacent spring units, a notched lug protruding from the confronting face of one jaw for spacing the end convolution of one spring unit therefrom to provide a clearance space for the tie wire, the confronting face of the other jaw having angular guide grooves for the tie wire to guide the same outside of and into embracing relation with the end convolution of the other spring unit, and notched portions opening through the free ends of the jaws for spacing the end convolutions of the spring units from the jaw shoulder to provide a clearance for the tie wire.

7. In an apparatus for assembling coiled spring units by means of helical tie wires which embrace the overlapped end convolutions of adjacent spring units, a table, a lower fixed beam secured upon the table, an upper beam mounted for vertical guided movement towards an away from the lower beam, a plurality of spring unit positioning and tie wire guiding members carried respectively by the upper side of the lower beam and the lower side of the upper beam, each pair of upper and lower members including a pair of relatively movable jaws adapted to cooperate with the upper and lower end convolutions of a pair of spring units of adjacent rows to position and retain the same in overlapped relation and to provide guideways for upper and lower tie wires fed longitudinally of the beams, means for raising said upper beam to facilitate the positioning and removal of the spring units, and means for lowering said upper beam when the spring units are emplaced to tension and retain the units by said tensioning action, and a common means on each beam for effecting the simultaneous closing of said jaws after the end convolutions of the spring units have been positioned therebetween.

8. In an apparatus for assembling coiled spring units by means of helical tie wires which embrace the overlapped end convolutions of adjacent spring units, a spring positioning and tie wire guiding member including relatively movable clamping jaws for receiving and retaining in predetermined position therebetween the end convolutions of adjacent spring units, and means on the confronting face of one clamping jaw for spacing the end convolution of one spring unit from the face thereof to provide a clearance for the tie wire, and the confronting face of the opposite jaw having a series of spaced parallel inclined grooves corresponding to the pitch of the helical tie wire for guiding said tie wire into embracing relation with the overlapped end convolutions of said adjacent spring units.

9. In an apparatus for assembling coiled spring units by means of helical tie wires which embrace the overlapped end convolutions of adjacent spring units, a spring positioning and tie wire guiding member including relatively movable clamping jaws for receiving and retaining in predetermined position therebetween the end convolutions of adjacent spring units, means on the confronting face of one clamping jaw for spacing the end convolution of one spring unit from the face thereof to provide a clearance for the tie wire, and a series of spaced parallel inclined means carried by the confronting face of the opposite jaw and corresponding to the pitch of the helical tie wire for guiding said tie wire into embracing relation with the overlapped upper and lower end convolutions of said adjacent spring units.

10. In an apparatus for assembling coiled spring units by means of helical tie wires which embrace the overlapped end convolutions of adjacent spring units, a beam, a plurality of spring unit positioning and tie wire guiding members carried by said beam, means for securing said members in adjusted spaced relation longitudinally of said beam so as to vary the spacing of the assembled coiled spring units and to compensate for variations in the diameters of said spring units, each member including relatively movable clamping jaws for receiving and retaining in predetermined position the end convolutions of adjacent spring units, means on the confronting face of one clamping jaw of each member for spacing the end convolution of one spring unit from said face to provide a clearance for the tie wire, and a series of spaced parallel inclined means carried by the confronting face of the opposite jaw of each member and corresponding to the pitch of the helical tie wire for guiding said tie wire into embracing relation with the overlapped end convolutions of said adjacent spring units.

11. In an apparatus for assembling coiled spring units by means of helical tie wires which embrace the overlapped end convolutions of adjacent spring units, upper and lower beams, a plurality of spring unit positioning and tie wire guiding members carried respectively by said upper and lower beams, each member including relatively movable clamping jaws for receiving and retaining in predetermined position therebetween the upper and lower end convolutions of adjacent spring units, means on the confronting face of one clamping jaw of each member for spacing the end convolution of one spring unit from said face to provide a clearance for the tie wire, grooves formed in the confronting face of the opposite jaw of each member for guiding the tie wires into embracing relation with the overlapped upper and lower end convolutions of said adjacent spring units, and a common means on each of the beams engageable with the movable clamping jaws thereon to simultaneously effect the closing movement of the same.

12. In an apparatus for assembling coiled spring units by means of helical tie wires which embrace the overlapped end convolutions of adjacent spring units, a table, a lower fixed beam secured upon the table, an upper beam mounted for vertical guided movement towards and away from the lower beam, a plurality of spring unit positioning and tie wire guiding members carried respectively by the upper side of the lower beam and the lower side of the upper beam, each pair of upper and lower members including a pair of relatively movable jaws adapted to cooperate with the upper and lower end convolutions of a pair of spring units of adjacent rows to position and retain the same in overlapped relation and to provide guideways for upper and lower tie wires fed longitudinally of the beams, means for raising said upper beam to facilitate the positioning and removal of the spring units, and means for lowering said upper beam when the spring units are emplaced to tension and retain the units by said tensioning action.

SAMUEL S. MARCUS.
SAMUEL KRAKAUER.